(12) United States Patent
Eisenberger et al.

(10) Patent No.: US 10,352,469 B2
(45) Date of Patent: Jul. 16, 2019

(54) ELECTROMAGNETIC PRESSURE CONTROL VALVE

(71) Applicant: ECO Holding 1 GmbH

(72) Inventors: Andreas Eisenberger, Nuertingen (DE); Bernd Franz, Stuttgart (DE)

(73) Assignee: ECP Holding 1 GmbH, Marktheidenfeld (DE)

( * ) Notice: Subject to any disclaimer, the term of this patent is extended or adjusted under 35 U.S.C. 154(b) by 61 days.

(21) Appl. No.: 15/727,802

(22) Filed: Oct. 9, 2017

(65) Prior Publication Data

US 2018/0112792 A1    Apr. 26, 2018

(30) Foreign Application Priority Data

Oct. 21, 2016 (DE) .................... 10 2016 120 118

(51) Int. Cl.
| | | |
|---|---|---|
| F16K 31/06 | (2006.01) | |
| F16K 3/26 | (2006.01) | |
| G05D 16/20 | (2006.01) | |
| F16H 61/02 | (2006.01) | |
| F15B 13/04 | (2006.01) | |

(52) U.S. Cl.
CPC ...... F16K 31/0613 (2013.01); F15B 13/0407 (2013.01); F16H 61/0251 (2013.01); F16K 3/26 (2013.01); F16K 31/0696 (2013.01); G05D 16/2013 (2013.01)

(58) Field of Classification Search
CPC .... F16K 31/0696; F16K 31/0613; F16K 3/26; F16H 61/0251; F15B 13/0407; G05D 16/2013

USPC .................................. 137/625.25; 251/48
See application file for complete search history.

(56) References Cited

U.S. PATENT DOCUMENTS

| | | | | |
|---|---|---|---|---|
| 2,996,082 A | * | 8/1961 | Miner | F16K 31/0613 137/625.4 |
| 3,371,685 A | * | 3/1968 | Tilney, Sr. | F16K 11/07 137/613 |
| 4,662,605 A | * | 5/1987 | Garcia | F16K 31/0613 251/129.08 |
| 5,577,534 A | * | 11/1996 | Ward | F15B 13/0418 137/596.17 |

(Continued)

FOREIGN PATENT DOCUMENTS

| | | |
|---|---|---|
| DE | 19904902 A1 | 8/2000 |
| DE | 20311689 U1 | 10/2003 |

(Continued)

*Primary Examiner* — Umashankar Venkatesan
(74) *Attorney, Agent, or Firm* — Von Rohrscheidt Patents (57) ABSTRACT

An electromagnetic pressure regulation valve including an electromagnetic actuator that positions a piston that is received axially movable in a controller housing, wherein the piston is configured to open and/or close connections of the pressure control valve for flow through, wherein the piston includes a pin at a face surface that is oriented away from the electromagnetic actuator, wherein a relative movement is facilitated between the pin and the piston, wherein a pin face that is oriented away from the piston in the controller housing is arranged opposite to a stop, wherein the pressure control valve includes a hydraulic end position damping for damping a movement of the pin in a direction towards the stop.

13 Claims, 4 Drawing Sheets

(56) References Cited

U.S. PATENT DOCUMENTS

| | | | | |
|---|---|---|---|---|
| 5,947,442 | A * | 9/1999 | Shurman | F02M 63/0017 |
| | | | | 251/129.16 |
| 6,065,496 | A * | 5/2000 | Sanzenbacher | F15B 13/0402 |
| | | | | 137/625.65 |
| 2006/0243938 | A1 * | 11/2006 | Ishibashi | F16K 31/0613 |
| | | | | 251/129.15 |
| 2008/0257433 | A1 * | 10/2008 | Tsujimoto | F16K 31/0613 |
| | | | | 137/625.61 |
| 2012/0112111 | A1 * | 5/2012 | Schmid | F16K 31/0613 |
| | | | | 251/318 |
| 2016/0017991 | A1 * | 1/2016 | Boban | F16H 61/30 |
| | | | | 137/625.18 |
| 2018/0112792 | A1 * | 4/2018 | Eisenberger | F16K 3/26 |
| 2018/0238471 | A1 * | 8/2018 | Merrill | F16K 3/243 |

FOREIGN PATENT DOCUMENTS

| | | | | |
|---|---|---|---|---|
| DE | 10241449 | * | 3/2004 | F16K 31/02 |
| DE | 10241499 | A1 | 3/2004 | |
| DE | 102012112481 | A1 | 6/2014 | |
| DE | 102013107127 | A1 | 1/2015 | |
| DE | 102016202430 | A1 | 8/2017 | |
| EP | 1762765 | | 3/2007 | |
| GB | 739930 | A | 11/1955 | |
| GB | 2278186 | A | 11/1994 | |

* cited by examiner

ELECTROMAGNETIC PRESSURE CONTROL VALVE

RELATED APPLICATIONS

This application claims priority from and incorporates by reference German Patent Application DE 10 2016 120 118.9 filed on Oct. 21, 2016.

FIELD OF THE INVENTION

The invention relates to an electromagnetic pressure control valve according to the preamble of patent claim 1.

BACKGROUND OF THE INVENTION

Electromagnetic pressure control valves are known in the art. They are used for example for hydraulically controlling a clutch for an automatic transmission of a motor vehicle. The pressure control valves include an axially movable piston in a controller housing wherein the piston is provided for opening and/or closing connections. The piston is axially moved by an electromagnetic actuator. In order to provide an adaptation of the actuation force of the electromagnetic actuator the pressure control valve includes a pin at a piston end that is oriented away from the electromagnetic actuator wherein the pin is also designated as a needle that is received in a receiving opening of the piston. The pin is arranged at a wall of the controller housing that is arranged opposite to the piston end wherein the wall is configured as a stop for the pin and a relative movement is generated between the piston and the pin when the piston moves. An electromagnetic pressure control valve configured this way can be derived from the two publication documents DE 102 41 449 A1 and EP 1 762 765 A2.

BRIEF SUMMARY OF THE INVENTION

The axial movement of the piston changes a volume formed between the pin and the receiving opening which can cause a damping of the piston movement since the volume is at least partially filled with the hydraulic fluid. Thus, a force equilibrium at the piston can be formed. However, there are load conditions during operation of the pressure controller or pressure oscillations in the connections which lead to a lift off of the piston from the wall when the magnet is provided with power and the piston is caused to move. It is a problem that the pin goes through a strong acceleration and impacts the wall. This in addition to damaging the wall e.g. by fracturing it leads to a breakout of the wall when the wall is inserted into the controller housing and thus leads to a failure of the pressure control valve.

Thus it is an object of the instant invention to provide an improved electromagnetic pressure control valve which eliminates the recited operational disadvantages.

The object is achieved according to the invention by an electromagnetic pressure regulation valve including an electromagnetic actuator that positions a piston that is received axially movable in a controller housing, wherein the piston is configured to open and/or close connections of the pressure control valve for flow through, wherein the piston includes a pin at a face surface that is oriented away from the electromagnetic actuator, wherein a relative movement is facilitated between the pin and the piston, wherein a pin face that is oriented away from the piston in the controller housing is arranged opposite to a stop, wherein the pressure control valve includes a hydraulic end position damping for damping a movement of the pin in a direction towards the stop. Advantageous embodiments with useful and nontrivial improvements of the invention are recited in the dependent claims.

An electromagnetic pressure control valve according to the invention includes an electromagnetic actuator for positioning a piston that is received axially movable in a controller housing. The piston opens and/or closes connections of the pressure control valve for the flow. The piston includes a pin at a face that is oriented away from the electromagnetic actuator wherein a relative movement can be provided between the pin and the piston. A pin face surface that is configured in the controller housing and oriented away from the piston is arranged opposite to a stop. In order to dampen a movement of the pinion towards the stop the pressure control valve includes a hydraulic end position damping. The hydraulic end position damping is characterized in that the pin is hydraulically supported at an end that is oriented away from the piston. The hydraulic support is configured so that a force is generated by the face surface oriented towards the stop and the hydraulic fluid provided at the stop wherein the force counteracts the movement of the pin and thus brakes the pin or put differently dampens the movement of the pin. Due to the dampened movement of the pin an impact at the stop is reduced and damages to the stop are prevented. This provides an improved electromagnetic pressure control valve with an extended service life.

In one embodiment of the electromagnetic pressure control valve according to the invention the hydraulic end position damping includes a terminal element that receives the pin. The terminal element provides a receiving cavity which is fillable with the hydraulic fluid and into which the pin can penetrate. Advantageously the receiving space is configured as a dead hole so that a damping hydraulic volume is configured by a cone tip of the dead hole and the pin can only come in contact with the terminal element through a very small annular surface at its face. An impact and penetration of the pin into the dead hole of the terminal element that is filled with the hydraulic fluid hydraulically dampens the acceleration of the pin enough so that the terminal element is not damaged.

For further improved damping the hydraulic end position damping includes a relief opening. The relief opening assures a permanent filling of the volume formed between the piston and the terminal element in order to provide reliable damping.

In a cost effective embodiment the relief opening is configured at the controller housing.

In another embodiment of the pressure control valve according to the invention a variable volume is configured between the terminal element and the face surface wherein the variable volume is configured flowable through the relief bore hole so that the dampening hydraulic volume is reliably provided.

In another embodiment the terminal element includes a damping opening. The damping opening implements another control link for adjusting the damping so that the damping to be provided is adaptable to respective operating conditions of the electromagnetic pressure control valve.

The relief opening is positioned as a function of an installed position of the electromagnetic pressure control valve. It is an advantage of this embodiment that the relief opening of the electromagnetic pressure control valve does not have to be configured at a constant location at the pressure control valve. There is only a requirement to arrange the relief opening so that a reliable filling of the variable volume configured between the piston and the terminal element is implemented. Thus, a predetermined installation position and installation space can be taken into consideration.

In another embodiment a defined clearance is configured between the pin and the terminal element. The advantage of the defined clearance is that it provides a control loop element for adjusting the damping. The clearance has to be sized as a function of the application of the electromagnetic control valve and the requirements regarding response properties of the operating unit to be pressure loaded.

Another control element for adjusting the damping is a defined penetration depth of the pin into the terminal element. Also the defined penetration depth has to be sized as a function of an application of the electromagnetic pressure control valve and requirements regarding the response properties of the unit to be loaded.

A further improved damping effect of the hydraulic end position damping is facilitated by the terminal elements which includes a bevel at a receiving opening receiving the pin. The bevel is used for improved and quick penetration of the hydraulic fluid into the receiving opening of the terminal element and for protection of the receiving opening against a penetration or ingestion of particles so that a wedging of the pin caused by the particles is prevented. An opening angle of the bevel with a value of 120° has been proven particularly effective.

The bevel at the outer circumference of a shoulder surface of the terminal element configures the terminal element for simplified assembly. The bevel facilitates a simplified insertion of the terminal element into the controller housing.

In another embodiment of the electromagnetic pressure control valve according to the invention the terminal element is secured by at least one clamping element at the controller housing.

In order to advantageously secure the terminal element at the controller housing by the clamping element an element face surface that is oriented away from the piston is configured rounded. The advantage is a simplified engagement of the clamping element in the terminal element in particular when the terminal element includes a receiving opening at an element face that is oriented away from the piston.

Another advantage of the hydraulic end position damping is its effect during pressure increase exclusively. This means put differently that cut off properties of the valve are not influenced. The instant invention also prevents a lift off of the pin in addition to a hard impact of the pin since a movement impulse in both directions is dampened. Effects from dynamic interferences and pressure oscillation super positions are thus effectively eliminated in both directions. Thus, a cause of a failure of the electromagnetic pressure control valve is already prevented from the beginning. However, in case the pin lifts off from the stop a subsequent impact of the pin occurs with a greatly reduced velocity and thus remains without a damaging effect upon the pressure control valve.

BRIEF DESCRIPTION OF THE DRAWINGS

Further advantages, features and details of the invention can be derived from the subsequent description of advantageous embodiments and from the drawing figures. The features and feature combinations recited in the preceding description and the features and feature combinations recited in the subsequent figure description and/or in the figures are not only usable in the respectively recited combination but also in the other combinations or individually without departing from the spirit and scope of the invention. Identical or functionally equivalent elements are associated with identical reference numerals. For reasons of clarity the elements may not be provided with reference numerals in all figures without losing their association, wherein.

DETAILED DESCRIPTION OF THE INVENTION

Figure 1:
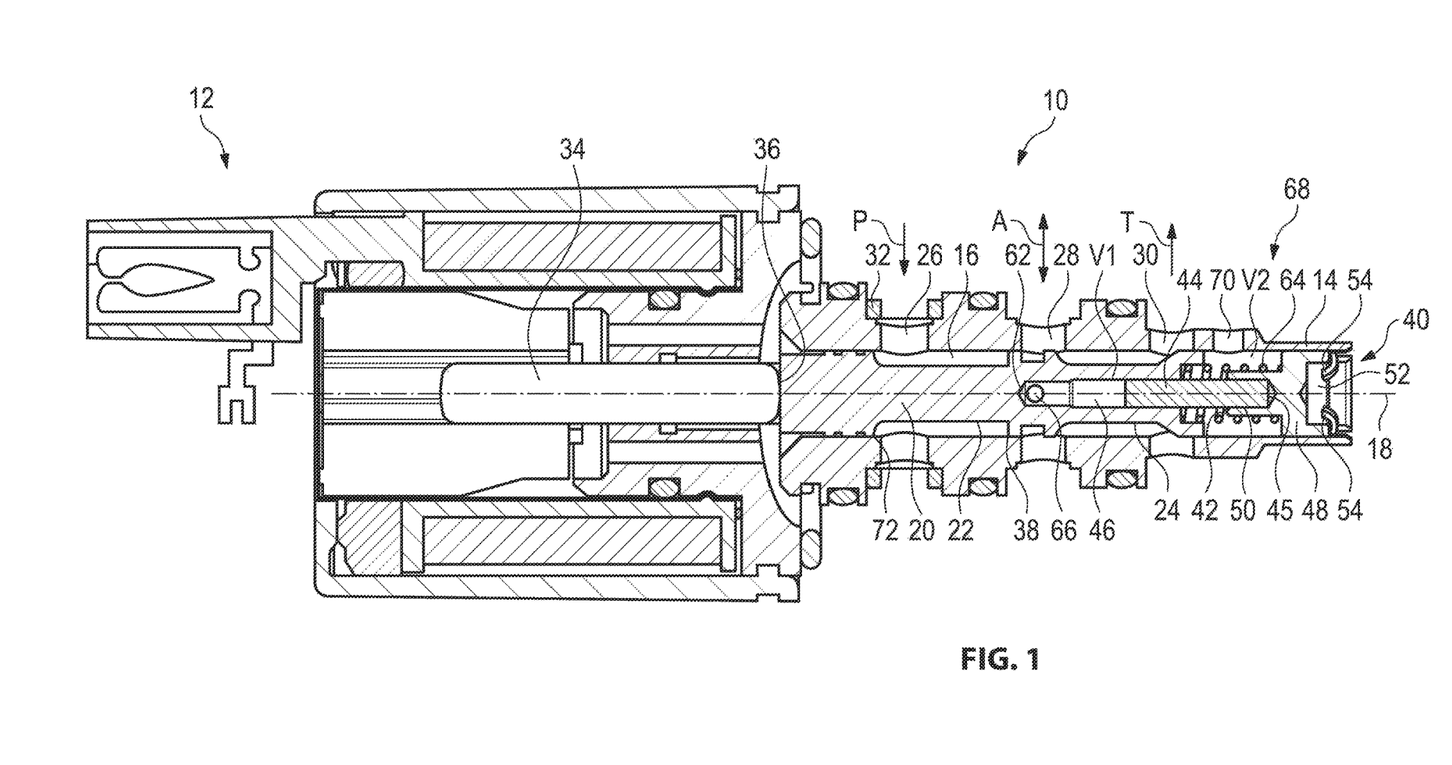
FIG. 1 illustrates longitudinal sectional view of an electromagnetic pressure control valve in a first position.

An electromagnetic pressure control valve 10 according to the invention is configured according to FIG. 1 for a clutch of an automatic transmission of a motor vehicle that is not illustrated in more detail. The pressure control valve 10 is illustrated in FIG. 1 in a first position which is characterized in that the electromagnetic actuator 12 of the pressure control valve 10 is not loaded with electrical current.

The pressure control valve 10 includes a controller housing 14 which is configured for connecting with hydraulic connections, a supply connection P, a consumer connection A and a tank connection T. In a first receiver opening 16 configured in the controller housing 14 a piston 20 is movably received that is axially movable along a longitudinal axis 18 of the controller housing 14. The controller housing 14 is configured rotation symmetrical with respect to the longitudinal axis 18.

The piston 20 is configured for controllable flow through of the hydraulic connections P, A, T. The piston 20 includes two control grooves configured over its circumference, a first control groove 22 and a second control groove 24. The first control groove 22 is configured to produce a flow connection between the supply connection P and the consumer connection A. The second control groove 24 is used for controlling a flow connection between the supply connection A and the tank connection T.

In order to provide the flow connection the controller housing 14 includes flow through openings that are serially arranged along the longitudinal axis 18 and which completely penetrate the controller housing 14, wherein a first flow through opening 26 is associated with the supply connection P, a second flow through opening is associated with the supply connection A and a third flow through opening 30 is associated with the tank connection T. A filter screen 32 is arranged in the first flow through opening 26 wherein the filter screen is used for filtering a hydraulic fluid flowing through the pressure control valve 10 wherein the hydraulic fluid is supplied to the pressure control valve 10 through the supply connection P.

For positioning the piston 20 the electromagnetic actuator 12 is configured with an axially movable plunger 34 which assumes its axial position corresponding to a loading of the electromagnetic actuator 12 with an electrical current. FIG. 1 illustrates the electromagnetic actuator 12 in a condition without electrical current and the plunger 34 is in an idle position.

At the plunger end 36 that is oriented toward the piston 20 the plunger 34 contacts the piston 20. Thus, the piston 20 also performs an axial movement when the plunger 34 moves.

Figure 2:
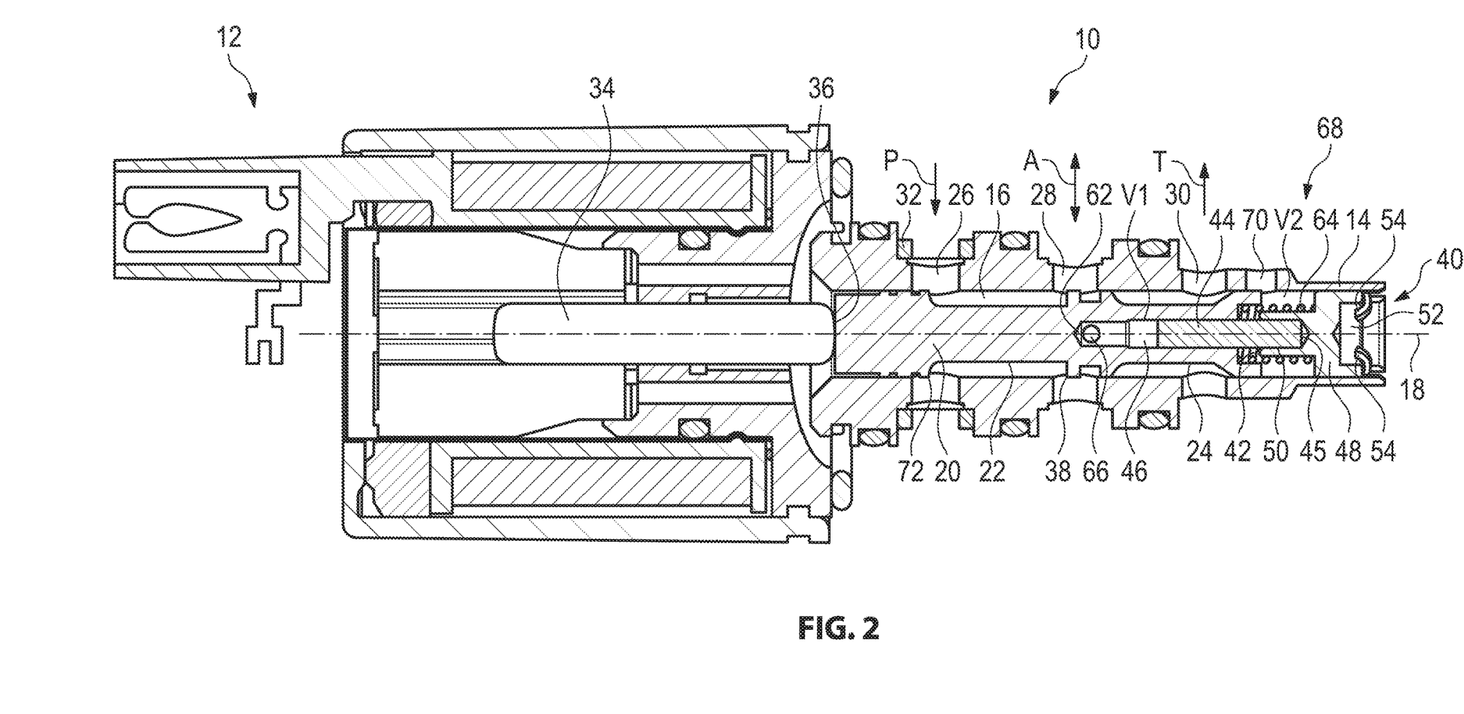
FIG. 2 illustrates a longitudinal sectional view of an electromagnetic pressure control valve according to FIG. 1 in a second position.

In FIG. 2 the pressure control valve 10 is illustrated in a second position where the consumer connection A is loaded with a hydraulic fluid from the supply connection P. The piston 20 is positioned by the plunger 34 so that the first control groove 22 releases the first flow through opening 26 and the second flow through opening 28. The first control edge 38 of the first control groove 22 which is oriented towards the second flow through opening 28 is moved axially in a direction towards a housing end 40 that is oriented away from the electromagnetic actuator, so that a flow through the second flow through opening 28 can be provided since a second control edge 72 of the first control groove 22, which second control edge is arranged opposite to the first control edge 38 is positioned so that it opens the first flow through opening 26.

The piston 20 includes a cylindrical pin 44 at a face 42 that is oriented towards the housing end 40 wherein the pin is received in a second receiving opening 46 configured in the piston 20. The pin 44 is moveable in the second receiving opening 46 relative to the piston 20 and positioned coaxial with the piston 20 in the second receiving opening 46.

The pin 44 is limited by a stop arranged opposite to a face 45 of the pin with respect to a movement of the pin in an axial direction that is oriented away from the piston 20.

Between the second receiving opening 46 and the pin 44 a variable first volume V1 is arrange able which dampens the piston movement. In order to supply the first volume V1 with the hydraulic fluid the piston 20 includes inlet openings 66 at an end portion 62 of the second receiving opening 46 wherein the end portion 62 is arranged opposite to the pin 44. The inlet openings 66 are configured in the piston 20 so that a hydraulic fluid supply or draining of the first volume V1 can be provided through the supply connection A. Overall two inlet openings 66 are arranged evenly distributed over a circumference of the piston 20.

The pin 44 is supported at a terminal element 48 configured as a stop, wherein the pin engages a third receiving opening 50 associated with the terminal element 48 and arranged coaxial with the longitudinal axis 18. In addition to receiving the pin 44 the terminal element 48 is used for sealing the pressure control valve 10. This means put differently that the terminal element 48 is configured as a sealing cover of the controller housing 14 for covering the first receiving opening 16.

Figure 3:
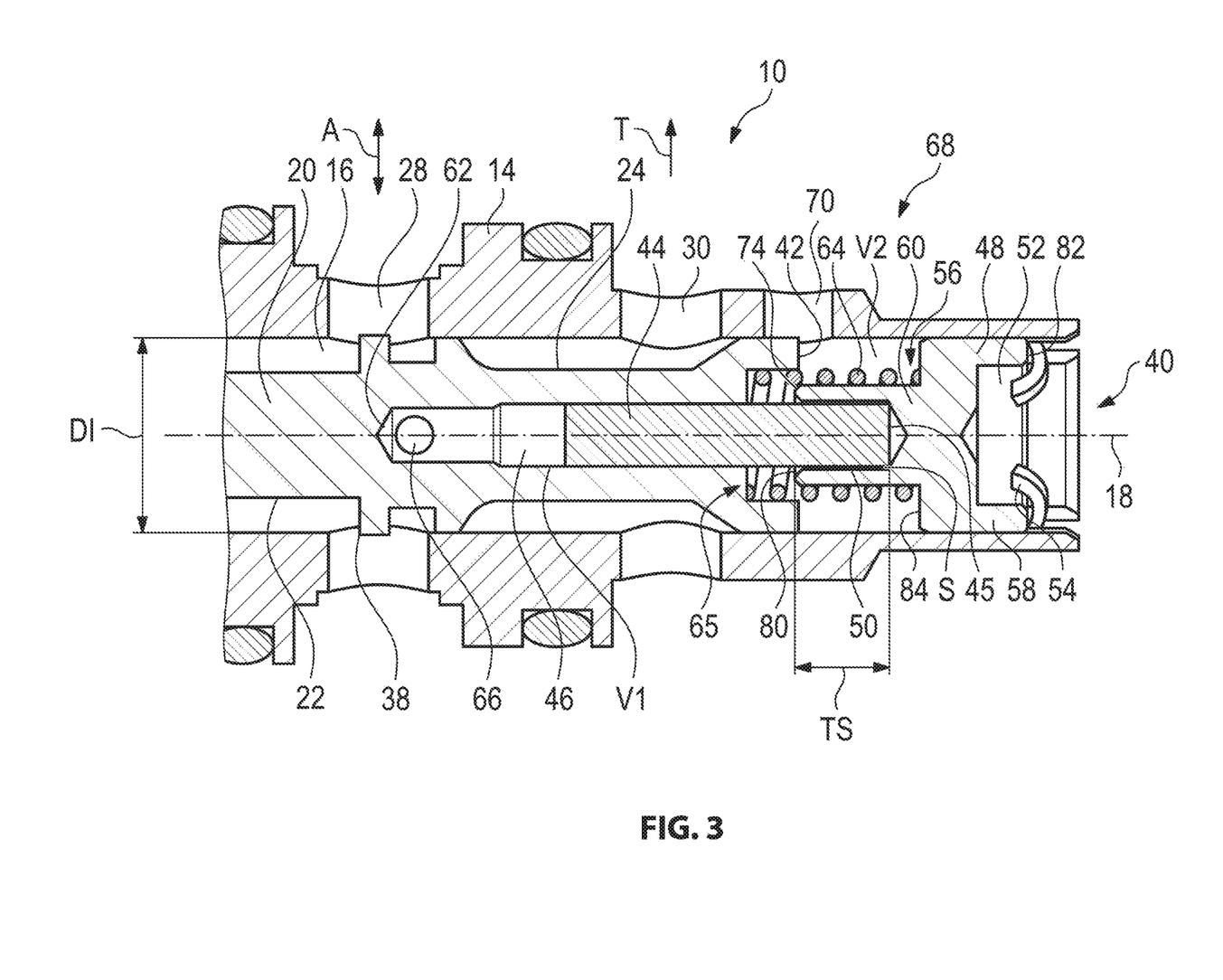
FIG. 3 illustrates a blown up representation of a detail of the pressure control valve according to FIG. 2.

In order to provide an improved understanding of the invention FIG. 3 illustrates a detail of the pressure control valve 10 in a blown up representation.

Figure 4:
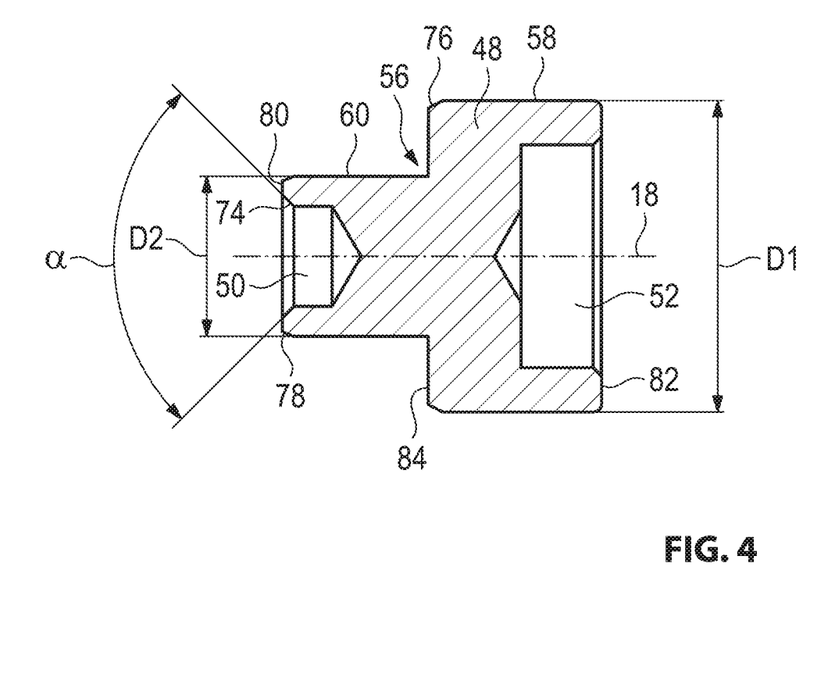
FIG. 4 illustrates a longitudinal sectional view of a terminal element of the pressure control valve according to the invention.

The rotation symmetrical terminal element 48 is illustrated in a longitudinal sectional view in FIG. 4. In addition to the third receiving opening 50 which is configured at a first element face 80 of the terminal element 48 the terminal element 48 includes a fourth receiving opening 52 at a second element face 82 that is oriented away from the first element face 80.

A first diameter D1 of the terminal element 48 corresponds to an interior diameter DI of the controller housing 14 which corresponds to a diameter of the first receiving opening 16, wherein the first diameter D1 is advantageously configured to provide a press fit between the terminal element 48 and the controller housing 14. An additional safety against a disengagement of the terminal element 48 is configured in the form of clamping elements 54 which are configured from the controller housing 14 so that they engage the fourth receiving opening 52.

The terminal element 48 has a shoulder 56 which is arranged between a sealing first element portion 58 of the terminal element 48 with a first diameter D1 and a volume forming second portion 60 of the terminal element 48 with a second diameter D2. The second diameter D2 is smaller than the first diameter D1 so that a second volume V2 is formed between the second element portion 60, the piston 20 and the controller housing 14. In order to provide a controlled linear movement of the piston 20 a preload element 64 is arranged between the piston 20 and the terminal element 48 wherein the preload element is configured as a spiral spring in this embodiment.

The preload element 64 is supported at one end at a shoulder 56 at an annular shoulder surface 84 of the first element portion 58 and at another end at the piston 20. For secure positioning the preload element 64 is received at the other end in the second receiving opening 46 wherein the preload element is contact supported at this location at another shoulder 65 which is configured in the piston 20.

The additional shoulder 65 provides in addition to the support of the preload element 64 a limitation of the axial piston movement since the second element portion 60 is configured so that it protrudes into the second receiving opening 46 and so that it can contact the additional shoulder 65.

The pressure control valve 10 includes a hydraulic end position damping 68. The hydraulic end position damping 68 causes a dampened or even zeroed acceleration of the pin 44 in particular load situations.

The hydraulic end position dampening 68 in addition to the closure element 48 and the reception of the pin 44 provided by the terminal element 48 includes a relief opening 70 which is provided in the illustrated embodiment in the controller housing 14 adjacent to the tank connection T and configured as a flowable bore hole. The relief opening 70 establishes a flowable connection between the second volume V2 and the tank connection T.

The relief opening 70 has to be configured at the pressure control valve 10 so that the second volume V2 is completely filled with the hydraulic fluid. In the illustrated embodiment the illustrated horizontal position of the pressure control valve 10 corresponds to its installation position. Thus, the relief opening 70 is arranged above the pin 44 and the terminal element 48 at an angle of 90° to the longitudinal axis 18 in order to provide safe filling of the second volume V2.

In an embodiment that is not illustrated in more detail the relief opening 70 is flow connected with another connection with the tank connection T in order to provide independent positioning. This means put differently that mounting the pressure control valve 10 is possible independently from a position orientation of the relief opening 70 while simultaneously providing complete filling of the second volume V2.

In order to provide improved insertion of the pin 44 into the third receiving opening 50 the second element portion includes a bevel 74 that opens from an inside out at an end of the second element portion that is oriented towards the piston 20, wherein an opening angle α of the bevel 74 advantageously has a value of 120°, Furthermore the bevel 74 is used for improved and quicker filling of the third receiving opening 50 and thus of the receiving cavity that is configured between the pin 44 and the terminal element 48 wherein the receiving cavity is to be continuously filled with hydraulic fluid in order to provide hydraulic damping of the pin 44.

An additional bevel 78 is provided at an outer circumference of the second element portion 60 at an end that is oriented towards the piston 20.

In order to provide quicker assembly the terminal element 48 includes another bevel 76 at the outer circumference of the shoulder surface 84 so that a simplified insertion of the terminal element 48 can be provided. The second element face surface 82 is configured cambered in a direction towards the clamping elements 54 for simple and safe reception of the clamping elements 54.

The two receiving openings 50, 52 of the terminal element 48 are configured as a bore hole in a cost effective manner, in particular as dead holes, and the second receiving opening 46 is configured as a dead hole as well.

A defined clearance that is configured between the pin 44 and the second element portion 60 is provided as a control element for regulating the damping in addition to a defined penetration depth TS of the pine 44 into the third receiving opening. This means put differently that the damping can be adjusted according to the sizing of the penetration depth TS and/or of the clearance S. Depending on the requirements and/or the application of the electromagnetic pressure control valve 10 the damping can be adjusted through the penetration depth TS and/or through the clearance S.

In another non illustrated embodiment the electromagnetic pressure control valve 10 includes a damping opening that starts from the third receiving opening 50 and facilitates a flow through the terminal element 48. The damping opening serves as another control element for the regulation of the damping.

What is claimed is:

1. An electromagnetic pressure control valve comprising:
    an electromagnetic actuator that positions a piston that is received axially movable in a controller housing,
    wherein the piston is configured to open or close connections of the pressure control valve for a flow through,
    wherein the piston includes a pin at a piston face that is oriented away from the electromagnetic actuator,
    wherein a relative movement is facilitated between the pin and the piston,
    wherein a pin face that is oriented away from the piston is arranged opposite to a stop arranged in the controller housing,
    wherein the pressure control valve includes a hydraulic end position damping for damping a movement of the pin in a direction towards the stop, and
    wherein the hydraulic end position damping includes a terminal element receiving the pin.

2. The electromagnetic pressure control valve according to claim 1, wherein the hydraulic end position damping includes a relief opening.

3. The electromagnetic pressure control valve according to claim 2, wherein the relief opening is configured at the controller housing.

4. The electromagnetic pressure control valve according to claim 1, wherein a variable volume is provided between the terminal element and the piston face.

5. The electromagnetic pressure control valve according to claim 1, wherein the terminal element includes a damping opening.

6. The electromagnetic pressure control valve according to claim 2, wherein the relief opening is positioned as a function of an installation positon of the electromagnetic pressure control valve.

7. The electromagnetic pressure control valve according to claim 1, wherein a defined clearance is provided between the pin and the terminal element.

8. The electromagnetic pressure control valve according to claim 1, wherein the pin is provided with a penetration depth that is defined in the terminal element.

9. The electromagnetic pressure control valve according to claim 1, wherein the terminal element includes a bevel at a receiving opening that receives the pin.

10. The electromagnetic pressure control valve according to claim 9, wherein the bevel has an opening angle with a value of approximately 120°.

11. The electromagnetic pressure control valve according to claim 1, wherein the terminal element includes a bevel at a shoulder surface at an outer circumference of the terminal element.

12. The electromagnetic pressure control valve according to claim 1, wherein the terminal element is secured at the controller housing by at least one clamping element.

13. The electromagnetic pressure control valve according to claim 12, wherein a face of the terminal element that is oriented away from the piston is configured rounded.

* * * * *

UNITED STATES PATENT AND TRADEMARK OFFICE
CERTIFICATE OF CORRECTION

| | | |
|---|---|---|
| PATENT NO. | : 10,352,469 B2 | Page 1 of 1 |
| APPLICATION NO. | : 15/727802 | |
| DATED | : July 16, 2019 | |
| INVENTOR(S) | : Andreas Eisenberger and Bernd Franz | |

It is certified that error appears in the above-identified patent and that said Letters Patent is hereby corrected as shown below:

On the Title Page

Item (73), Line 1, should read:
ECO Holding 1 GmbH

Signed and Sealed this
Twenty-first Day of April, 2020

Andrei Iancu
*Director of the United States Patent and Trademark Office*